US009057263B2

(12) United States Patent
Whittaker et al.

(10) Patent No.: US 9,057,263 B2
(45) Date of Patent: Jun. 16, 2015

(54) SELF-CONTAINED REFUGE CHAMBER

(76) Inventors: Geoffrey Allan Whittaker, Mt. Nasura (AU); Gerald John Ness, Wembley (AU)

( * ) Notice: Subject to any disclaimer, the term of this patent is extended or adjusted under 35 U.S.C. 154(b) by 459 days.

(21) Appl. No.: 12/506,801

(22) Filed: Jul. 21, 2009

(65) Prior Publication Data

US 2010/0018391 A1    Jan. 28, 2010

(30) Foreign Application Priority Data

Jul. 21, 2008    (AU) .............................. 2008903738

(51) Int. Cl.
*B01D 53/62*    (2006.01)
*E21F 11/00*    (2006.01)

(52) U.S. Cl.
CPC ............... *E21F 11/00* (2013.01); *B01D 53/62* (2013.01); *B01D 2251/304* (2013.01); *B01D 2251/404* (2013.01); *B01D 2251/604* (2013.01); *B01D 2255/2073* (2013.01); *B01D 2255/20761* (2013.01); *B01D 2257/502* (2013.01); *B01D 2257/504* (2013.01); *B01D 2259/4566* (2013.01); *Y02C 10/04* (2013.01)

(58) Field of Classification Search
CPC ............... F02K 3/02; F02K 3/00; F02K 3/12; B01D 24/04; B01D 47/14; B01D 50/00; B01D 53/14
USPC ........ 95/23, 236, 228–229, 288; 96/242, 252, 96/397, 399, 244; 62/617, 50.4, 121; 423/220; 114/312; 109/1 S; 128/205.26; 165/61, 267
See application file for complete search history.

(56) References Cited

U.S. PATENT DOCUMENTS

| | | | |
|---|---|---|---|
| 3,661,107 A * | 5/1972 | Jacobs et al. .................. 114/312 |
| 3,928,435 A * | 12/1975 | Awane et al. ................. 562/609 |
| 4,294,242 A * | 10/1981 | Cowans .................. 128/201.13 |
| 4,487,255 A * | 12/1984 | Bianchetta et al. ........... 165/267 |
| 4,631,872 A | 12/1986 | Daroga |
| 4,632,678 A | 12/1986 | Cosyns et al. |
| 5,365,745 A * | 11/1994 | Caldwell ........................ 62/50.4 |
| 6,016,803 A * | 1/2000 | Volberg et al. ........... 128/205.26 |
| 6,709,483 B1 | 3/2004 | Hodgson, Jr. |
| 7,533,942 B2 * | 5/2009 | Kennedy et al. ................ 299/12 |

(Continued)

FOREIGN PATENT DOCUMENTS

WO    2007/112482 A1    10/2007
WO    2008/039347 A2    4/2008

OTHER PUBLICATIONS

International Search Report and Written Opinion issued in International Application No. PCT/AU2009/000934, mailed Oct. 22, 2009, 17 pages.

(Continued)

*Primary Examiner* — Duane Smith
*Assistant Examiner* — Minh-Chau Pham
(74) *Attorney, Agent, or Firm* — Rothwell, Figg, Ernst & Manbeck, P.C.

(57) ABSTRACT

An apparatus for treating a medium, the apparatus including structure for generating a flow of a working fluid in a flow path, treatment structure for subjecting the medium to treatment and a delivery device for delivering the medium to the treatment structure, the treatment structure and the delivery device being operable in response to the flow of working fluid. A refuge chamber and method utilize such apparatus.

30 Claims, 10 Drawing Sheets

(56) References Cited

U.S. PATENT DOCUMENTS

| | | |
|---|---|---|
| 2007/0199244 A1 | 8/2007 | Kennedy et al. |
| 2008/0216653 A1* | 9/2008 | Paton-Ash et al. ............ 95/149 |
| 2009/0077946 A1* | 3/2009 | Ishiba .......................... 60/226.1 |
| 2009/0235816 A1 | 9/2009 | Farrugia et al. |
| 2010/0071393 A1* | 3/2010 | Tatton et al. .................... 62/121 |
| 2011/0195652 A1* | 8/2011 | Smith ........................... 454/184 |
| 2012/0247724 A1* | 10/2012 | Warren ............................ 165/61 |
| 2012/0304866 A1* | 12/2012 | Barrett ............................ 96/244 |
| 2013/0199423 A1* | 8/2013 | MacCallum et al. .......... 109/1 S |

OTHER PUBLICATIONS

Specification of U.S. Appl. No. 61/098,053, 12 pages, filed Sep. 19, 2008.

* cited by examiner

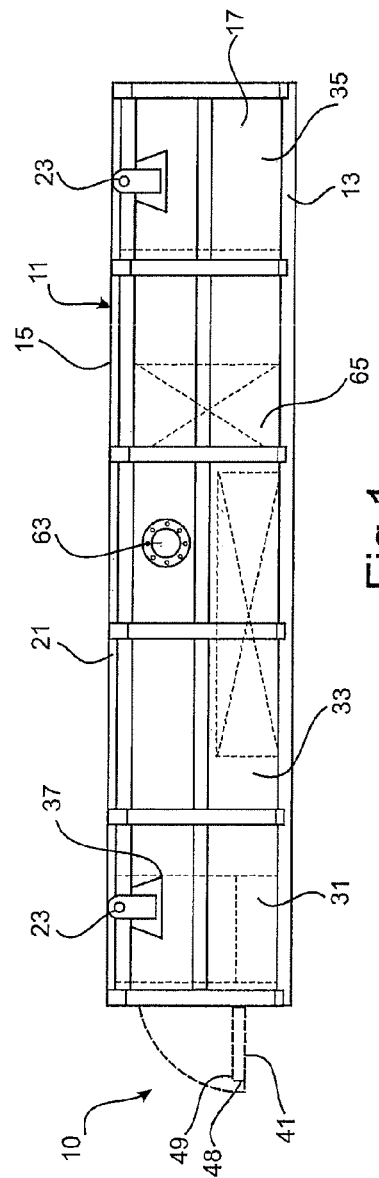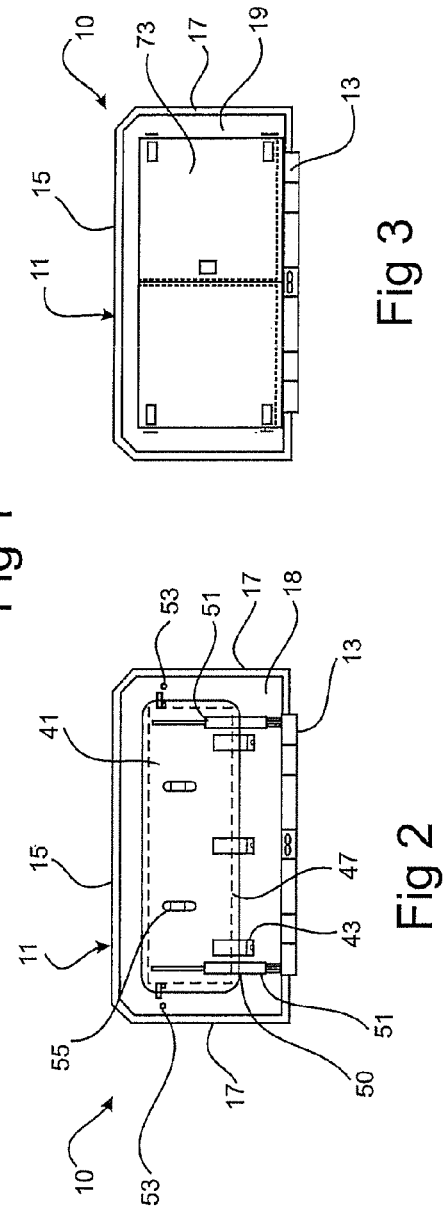

SELF-CONTAINED REFUGE CHAMBER

CROSS-REFERENCE TO RELATED APPLICATIONS

This application claims the benefit of Australian Patent Application No. 2008903738, filed Jul. 21, 2008, the disclosure of which is incorporated herein in its entirety by reference.

FIELD OF THE INVENTION

The invention relates to apparatus for providing a life-sustaining atmosphere within a closed environment. The invention also relates to refuge chambers comprising such apparatus.

Invention has been devised particularly, although not necessarily solely, in relation to a refuge chamber. It will be appreciated, however, that the invention is not so limited and aspects of the invention may have application in areas other than refuge chambers.

BACKGROUND ART

Refuge chambers are used in underground mining operations and other environments where it may be necessary to have an area where personnel can take refuge in the event of a catastrophe or other circumstances in which the lives or welfare of the personnel are put in jeopardy.

Typically, a refuge chamber comprises a protective environment in which personnel can take refuge and which can be closed with respect to the outside environment in which the refuge chamber is situated. The refuge chamber typically incorporates a system for maintaining a life-supporting environment within the chamber for at least a limited period of time. In this regard, the refuge chamber may incorporate a scrubbing assembly for removal of at least carbon dioxide arising from respiration of occupants within the closed environment.

Typically, there is a need to have access to an electrical power source to operate the scrubbing assembly for the duration of the period in which the life sustaining environment is provided. Typically, electrical power is required to drive a blower to cause air within the closed environment to circulate through the scrubbing assembly. Accordingly, access to an external mains electrical supply may be required.

As an alternative to having an external power supply, it is possible to have an electrical battery system within the refuge chamber for driving the blower. The electrical battery system does, however, require that the batteries are in a charged state in readiness for use.

With refuge chambers, there is no provision for controlling the climate within the closed environment, such as by heating or cooling. Such control would be advantageous in providing an environment which is more comfortable for personnel awaiting rescue.

It is against this background, and the problems and difficulties associated therewith, that the present invention has been developed.

SUMMARY

According to a first aspect to the invention there is provided an apparatus for treating a medium, the apparatus comprising means for generating a flow of a working fluid in a flow path, treatment means for subjecting the medium to treatment and delivery means for delivering the medium to the treatment means, the treatment means and the delivery means being operable in response to the flow of working fluid.

Preferably, the medium comprises a fluid medium. The fluid medium may be air.

Preferably, the means for generating a flow of working fluid comprise a source of the working fluid under pressure and the flow path communicating with the source.

Preferably, the source is a self-contained source. The self-contained source may comprise gas cylinder.

Preferably, the working fluid comprises a pressurized fluid. The pressurized fluid may comprise carbon dioxide.

Preferably, the delivery means comprise pump means for delivering the medium to the treatment means. The pump means is operable in response to the flow of the working fluid through the working fluid flow path. In one arrangement, the pump means may include a turbine with which the flow of working fluid interacts to drive the pump means. In another arrangement, the pump means may comprise a bellows which is adapted to expand and contract in response to controlled flow of the working fluid.

The treatment means may, in one arrangement, comprise at least one heat exchanger for cooling or heating of the medium. The working fluid operates the heat exchanger in the sense that it passes in heat exchange relation therewith, thereby being an integral part of the operation of the heat exchanger.

The treatment means may, in another arrangement, comprise scrubbing means for removing CO and $CO_2$ from the medium.

The treatment means may, of course, take any appropriate form for processing, filtering or otherwise treating the medium.

According to a second aspect to the invention there is provided a refuge chamber comprising an apparatus for treating a medium according to the first aspect of the invention.

The refuge chamber may define an accommodation zone containing air and the apparatus according to the first of the invention may be utilized to treat the air. In this way, a life sustaining environment within the accommodation zone may be prolonged.

According to a third aspect to the invention there is provided a method for treating a medium using the apparatus according to the first aspect of the invention.

BRIEF DESCRIPTION OF THE DRAWINGS

The invention will be better understood by reference to the following description of several embodiments thereof as shown in the accompanying drawings in which:

FIG. 1 is a schematic side view of a refuge chamber incorporating air treatment apparatus according to the first embodiment;

FIG. 2 is a front elevation of the refuge chamber;

FIG. 3 is rear elevation of the refuge chamber;

BEST MODE(S) FOR CARRYING OUT THE INVENTION

Figure 4:
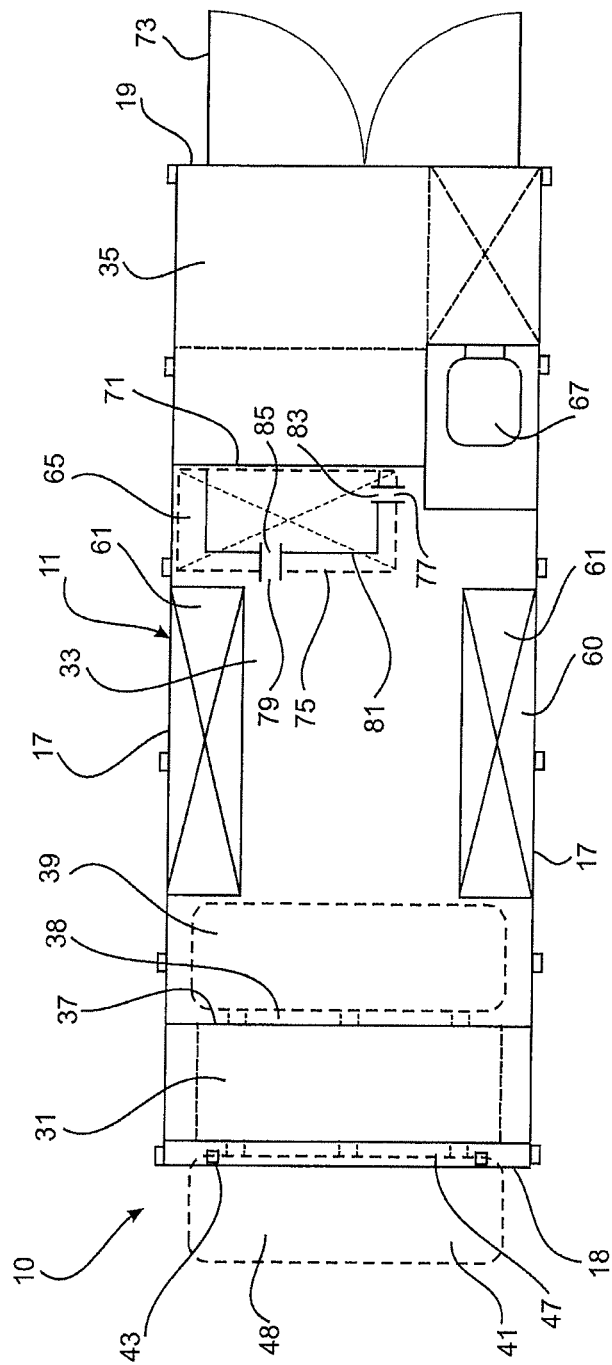
FIG. 4 is a schematic plan view of the refuge chamber.

FIGS. 1 to 4 show a refuge chamber 10 for providing a protective environment which can be closed and sealed from the outside environment in which it is located. The refuge chamber 10 has been devised particularly for use in underground mining operations and specifically underground coal mining operations. The refuge chamber has been dimensioned to be accommodated within tunnels typically used in coal mining operations in the United States. The refuge chamber can, of course, be used in any other appropriate location.

The refuge chamber 10 comprises a chamber structure 11 comprising a base 13, a top 15, two longitudinal side walls 17, a front wall 18, and a rear wall 19.

The chamber structure 11 incorporates provision 21 for engagement with lifting tines of a lifting apparatus such as a forklift. Further, the chamber structure 11 incorporates lifting lugs 23 on each side thereof.

The interior of the chamber structure 11 incorporates an access zone 31, an accommodation zone 33, and a services zone 35.

The access zone 31 provides access to the accommodation zone 33 and incorporates an airlock system. The access zone 31 is separated from the accommodation zone 33 by a wall 37 which incorporates an access way 38 which can be opened and closed by airlock door 39 to allow movement between the access zone 31 and the accommodation zone 33.

The front wall 18 incorporates a door 41 which can be opened to provide access to the access area 31. The door 41 comprises a panel mounted on hinges 43 for pivotal movement about a generally horizontal axis 42 between closed and open conditions. In the closed condition, the door 41 closes an entry opening 47 in the front wall 18. In the open position (as shown in dotted line in FIGS. 1 and 4), the door 41 extends outwardly from the opening 47 adjacent the lower edge thereof to assume a generally horizontal disposition to define a platform 48. The platform 48 has cushioning 49. The platform 48 provides a surface on which a person wishing to enter the refuge chamber can rest in a reclined position and then pass through the opening 47 into the access zone 31.

Figure 9:
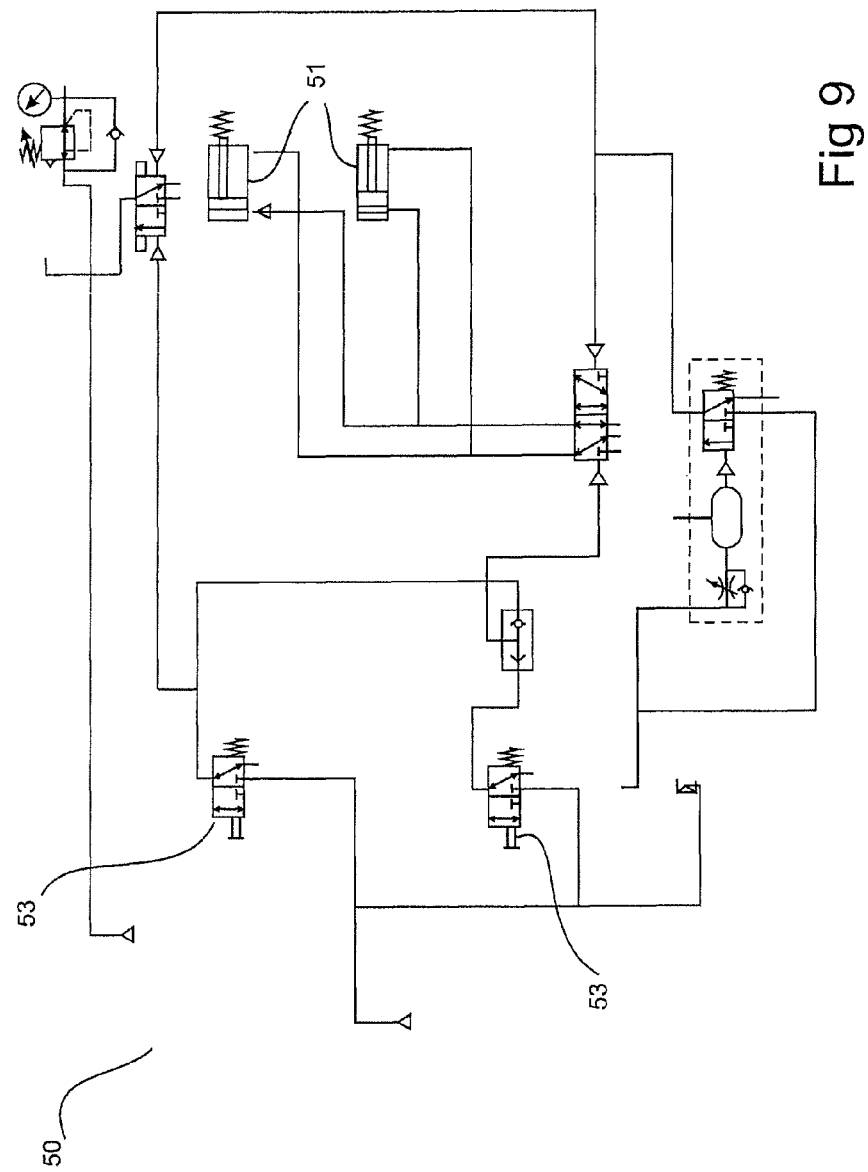
FIG. 9 is a schematic view of the control mechanism for operating the air curtain and the doors of the access zone.

A control mechanism 50 (see FIGS. 2 and 9) including pneumatic cylinders 51 is provided for opening and closing the door 41. Actuating elements 53 are operable from the exterior of the refuge chamber 10 to cause the control mechanism 50 to open the door 41. Once in the access chamber 31, a person can actuate another actuating element (not shown) to cause the door 41 to close under the influence of the pneumatic cylinders 51.

The access zone 31 incorporates the airlock system operated by the control mechanism 50. The airlock system is adapted to establish an air curtain at the opening 47 when the door 41 is in an open condition. The airlock system also flushes air from within the access zone 31 before a person within the access zone 31 can move into the accommodation zone 33. Vents 55 are incorporated in the door 41 for discharging the flushing air.

Air for the airlock of the doors 39 and 41 and air curtain is available from one or more air storage cylinders accommodated in the service zone 35.

The refuge chamber 10 may also comprise an alarm system. The alarm system may be a siren driven by, for example, air supplied from the air storage cylinders or over pressurization of a working flow path that runs air and water treatment units that will be described later.

The accommodation zone 33 incorporates seating 60 for occupants therein. In the arrangement shown, the seating comprises benches 61. A viewing porthole 63 is provided in each longitudinal side wall 17 at a location corresponding to the accommodation zone 33, so allowing occupants therein to have some exterior visibility and also allowing rescue personnel to inspect the interior of the accommodation zone 33 before entry thereto.

The accommodation zone 33 also incorporates a toilet facility 67.

The service zone 35 is isolated from the accommodation zone 33 by a wall 71. The service zone 35 is located adjacent rear end wall 19 and is accessible via rear doors 73 incorporated in end wall 19. The service area 35 can accommodate control equipment as well as auxiliary equipment and supplies for use in maintaining the life-sustaining environment in the accommodation zone 33, including cylinders containing oxygen, compressed air and liquid carbon dioxide.

The accommodation zone 33 also accommodates a module 65 for treatment of the air within the accommodation zone 33 to maintain a life-sustaining environment for an extended period of time. In the refuge chamber according to embodiments of the invention, the life-sustaining environment within the accommodation zone 33 can be maintained for approximately 100 hours with a plurality of persons accommodated therein.

Referring to FIG. 4, the module 65 comprises a housing 75 incorporating an air inlet 77 and air outlet 79 allowing intake of air from the accommodation zone 33 and return of the treated air to the accommodation zone 33. An apparatus 81 is incorporated in housing 75 for treating the air.

Figure 5:
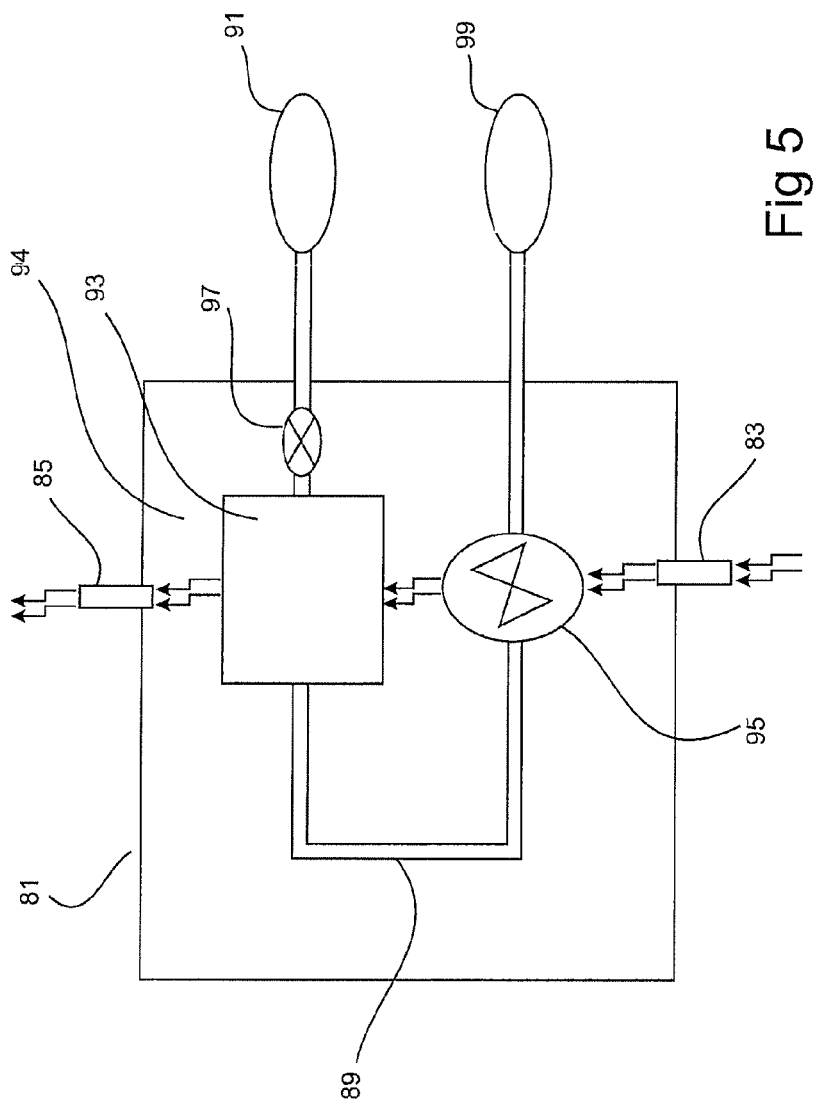
FIG. 5 is a schematic view of a module incorporated in the refuge chamber, the module incorporating the air treatment apparatus according to a first embodiment of the invention.

FIG. 5 shows the apparatus 81 according to a first embodiment of the invention. The apparatus 81 comprise a working fluid path 89 incorporating a treating means 93 and pump means 95. The pump means 95 allow interaction between the air undergoing treatment and the treating means 93.

The treatment means 93 comprises a heat exchanger as will be explained later. The working fluid operates the heat exchanger in the sense that it passes in heat exchange relation therewith, thereby being an integral part of the operation of the heat exchanger.

The pump means 95 is operable in response to the flow of the working fluid through the working fluid flow path. Typically, the pump means 95 includes a turbine with which the flow of working fluid interacts to drive the pump means 95.

The pump means 95 comprise a fan systems and/or bellow systems for delivery of the air to the treatment means 93. The treatment means 93 and the pump means 95 are operated by a working fluid flowing through the fluid path 89.

The working fluid is delivered from a cylinder or a bank of cylinders 91 to the working fluid path 89 and after operating the treatment means 93 and the pump means 95 is stored in cylinders 99. The working fluid may be, for example, carbon dioxide.

Valve means 97 are incorporated along the working fluid path 89 upstream of the treatment means 93 to control the flow of the working fluid from cylinders 91 into the working fluid path 89. The valve means 97 may include gauges 97c (see FIG. 7) to indicate the working fluid supply pressure. The valve means 97 may be operated from the inside of accommodation zone 33. The valve means 97 comprises ball valves 97a for allowing entry of the working fluid into the working fluid path 89 and regulator needle valve 97b for controlling the working fluid released into the working fluid path 89.

In this embodiment, the treatment process performed on the air is a cooling process. This provides cooling within the accommodation zone 33. Other arrangement may comprise treatment means for, for example, conduct processing actions such as removal of matter from the air. By way of example, the processing action may comprise scrubbing air to remove CO and $CO_2$ therefrom.

Accordingly, in the arrangement shown the treatment means 93 comprises an air cooler 94 for cooling the air 87 and the pump means 95 comprising a fan system for driving air 87 received from the accommodation zone into apparatus 81 to interact with the treatment means 93.

The air cooler 94 comprises at least one heat exchanger for extracting heat from the air 87 of the accommodation zone 33. The heat exchanger comprises coils in which the working fluid flows. The cooling process occurs as the air 87 contacts the coils of the heat exchanger. The working fluid passing through the coils of the heat exchanger expands and thus undergoes a temperature drop thereby producing a cooling effect to the air 87 as the air contacts the coils containing the cold working fluid. The air 87 is delivered to heat exchanger assembly by the pump means 95.

Also, dehumidification occurs as the metabolic heat and water vapour generated in the accommodation chamber 33 of the refuge chamber 10 come into contact with the heat exchanger of the treatment means 93.

The working fluid after exiting the treatment means 93 is conducted via the working fluid path 89 to the pump means 95 for operation thereof. The pump means 95 drives the air 87 of the accommodation zone 33 into apparatus 81 to interact with the means for treatment means 93 as previously explained. The working fluid after driving the pump means 95 exits the apparatus 81 and is stored in storage cylinders 99.

For the refuge chamber occupant's safety, cylinders 91 and 99 may be located in a storage area 35 outside of the accommodation zone 33 or outside the refuge chamber 10.

Figure 6:
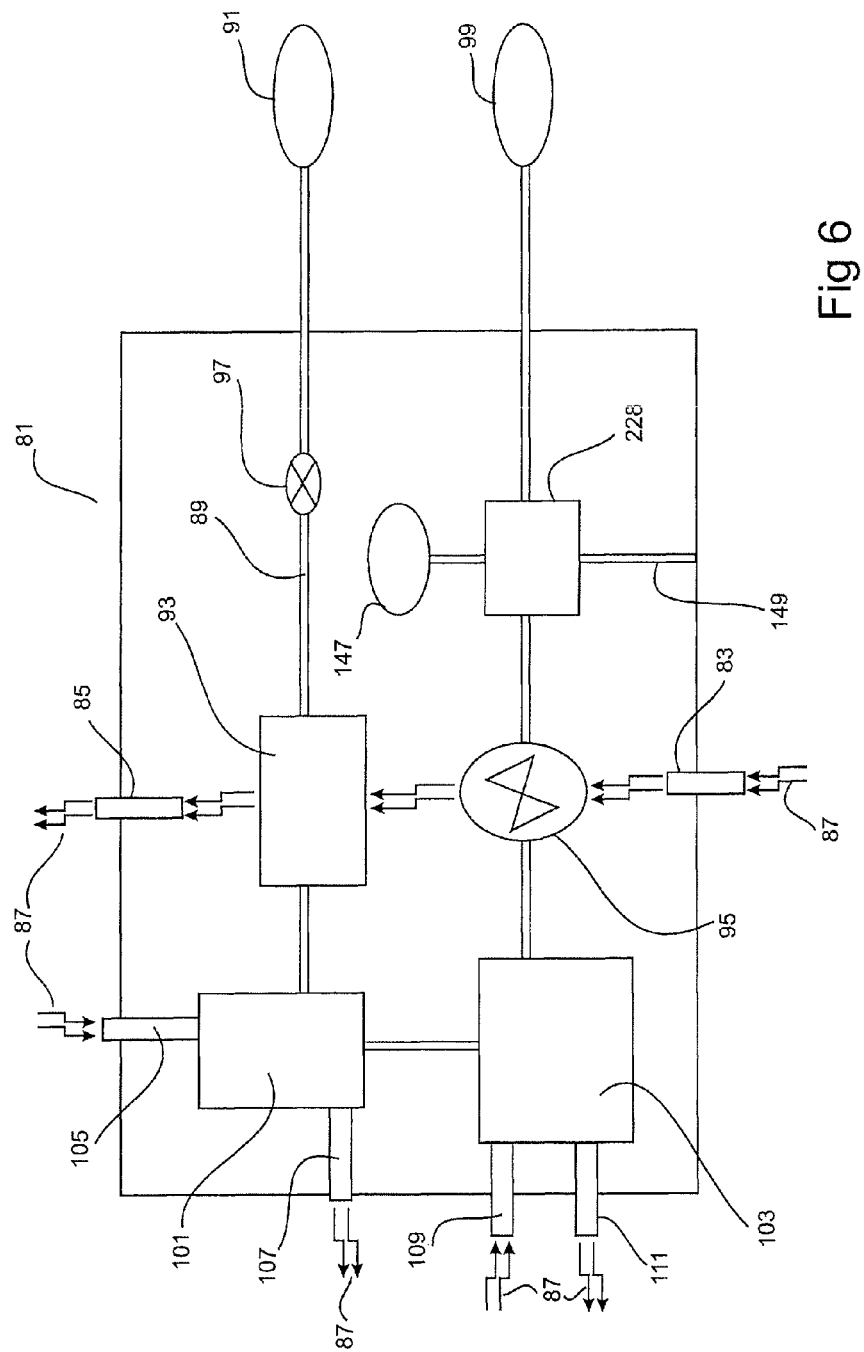
FIG. 6 is a schematic view of a module incorporated in the refuge chamber, the module incorporating an air treatment apparatus according to a second embodiment of the invention.

FIG. 6 shows an apparatus 81 according to a second embodiment of the invention. Similar reference numerals are used to identify similar parts in the apparatus 81 according to the first embodiment of the invention.

As shown in FIG. 6, the apparatus 81 according to the second embodiment of the invention comprises, in addition to the previously described treatment means 93 for reducing the temperature of the air, further treatment means 101 and 103. Treatment means 101 and 103 are connected along the working fluid path 89 and located downstream with respect to treatment means 93 and upstream with respect to pump means 95. In this arrangement, the working fluid after passing through the treatment means 93 is conducted via the working fluid path 89 to operate treatment means 101 and 103 for further treatment of the air 87. Valve means 97 (previously described) are incorporated along the working fluid path upstream of the treatment means 93 to control the flow of the working fluid from cylinders 91 into the working fluid path 89. In this embodiment the working fluid may be released at a rate of 0-30 Kg/hour.

The treatment means 101 and 103 incorporate, respectively, air inlets 105 and 107 and air outlets 109 and 111 for air intake from the accommodation zone 33 and air discharge to the accommodation zone 33 after treatment of the air 87. Inlets 105, 109 and outlets 107, 111 are communicated with air inlets 77 and air outlets 79 of housing 75.

Additionally, treatment means 228 may be incorporated into apparatus 81 for cooling of drinking water for the occupants of the accommodation zone 33. The treatment means 228 is connected along the working fluid path 89 and operated by the working fluid. The working fluid after operating treatment means 228 is exhausted to cylinders 99. A water supply 147 provides water to the treatment means 228. The water may be delivered to the interior of the accommodation zone through outlet 149.

In operation, the apparatus 81 receives the working fluid from cylinders 91 and, as explained with reference to the first embodiment of the invention, operate the treatment means 93. The working fluid after driving the treatment means 93 is conducted via the working fluid path 89 to treatment means 101 and 103 for further treatment of the air 87.

Figure 7:
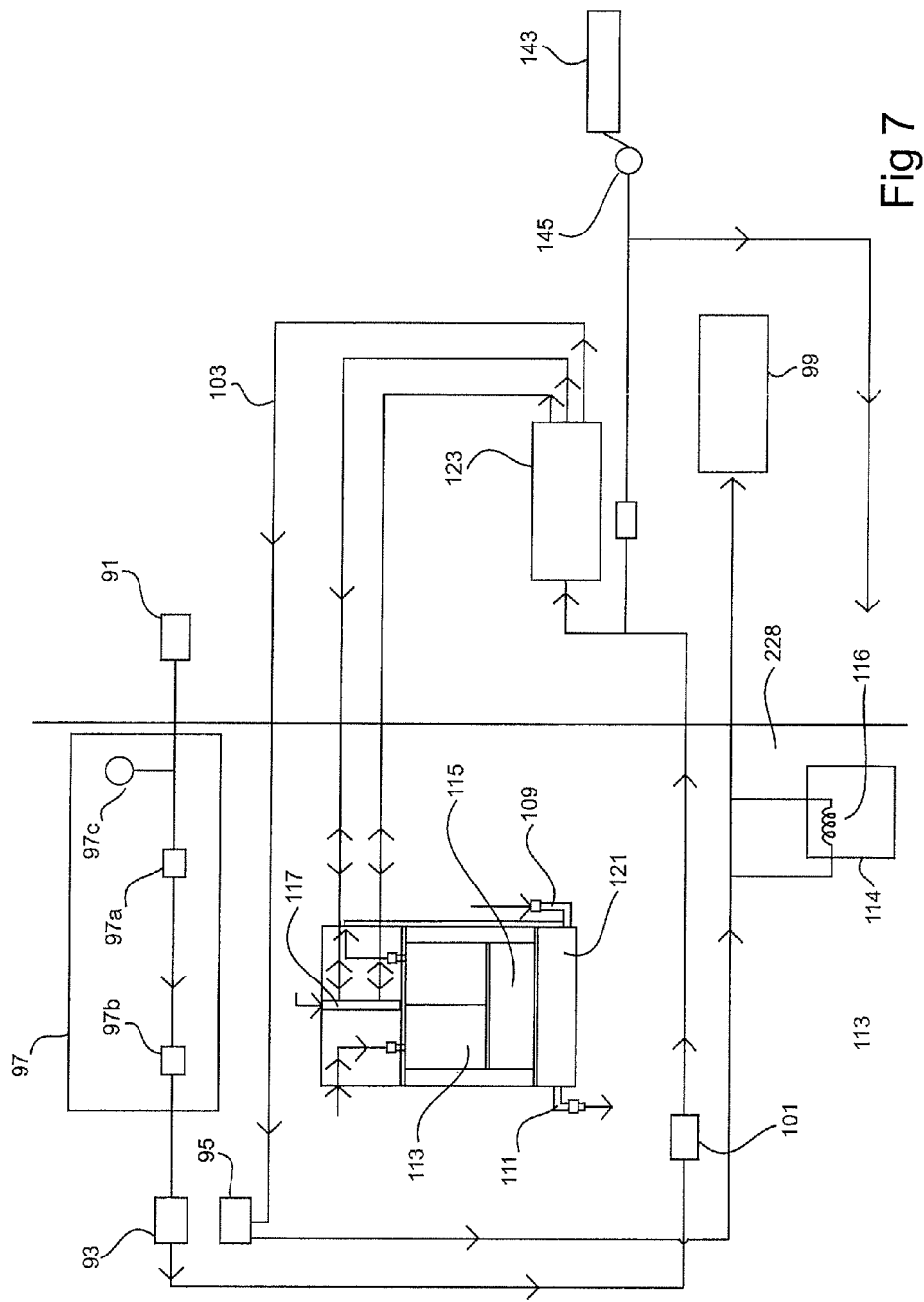
FIG. 7 is a schematic view of an air treatment apparatus included in the module shown in FIG. 6.

Referring to FIG. 7, the working fluid operates the treatment means 101 for a further heat absorption of the air 87. The cooling effect of the treatment means 101 is due to water evaporation. Treatment means 101 may be any type of evaporative cooler assemblies such residential and industrial coolers using direct evaporative cooling (i.e. swamp coolers).

After operating the treatment means 101, the working fluid is forwarded to treatment means 103. The treatment means 103 comprises an air scrubbing assembly 119 for $CO_2$ and/or CO scrubbing prolonging the life-sustaining environment in the accommodation zone 33. The air scrubbing assembly 119 incorporates an air box 121 comprising air treatment modules (carbon dioxide ($CO_2$) and/or carbon monoxide (CO) scrubbers). Air treatment modules comprise $CO_2$ scrubber unit(s) comprising a Sofnolime filter 115. Alternatively, the air treatment may also include carbon monoxide (CO) scrubbing. The CO scrubbing may be accomplished using moleculite. Where CO scrubbing is involved, it may comprise a process for converting the CO to $CO_2$ which is later removed during the $CO_2$ scrubbing process.

Figure 8:
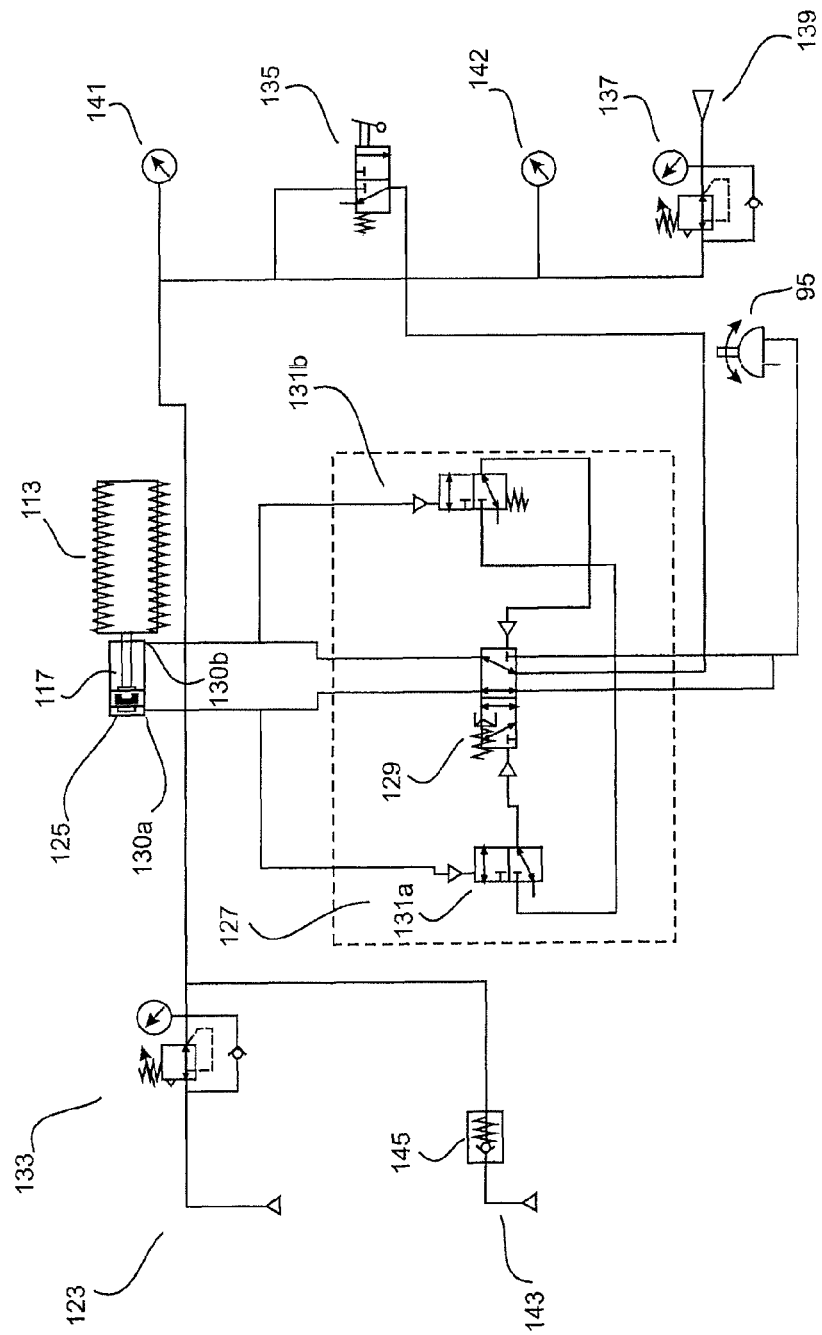
FIG. 8 is a schematic view of the pneumatic control module shown in FIG. 7.

The air of the accommodation zone 33 is passed through the scrubbing assembly 119 in order to render the air within the accommodation zone 33 breathable. This is accomplished by a pump means comprising bellows 113 adapted to generate an air flow within the air box 121. As shown in FIG. 8, a piston 117 is adapted to expand and retract the bellow 113 to draw air (via a non-return valve) from the accommodation zone 33 into the air box 121 which incorporates scrubber assemblies 119 and back into the accommodation zone 33 after treatment. Piston 117 is driven by the working fluid via a pneumatic control module 123 after operating the treatment means 93 and 101.

FIG. 8 shows the pneumatic control module 123 operating the piston 117 to drive bellow 113. In a similar fashion, other bellows (not shown) may be driven by the pneumatic control module 123. As shown in the FIG. 8, the pneumatic control system 123 receives the working fluid and selectively forwards the working fluid to opposite ends of the piston chamber 125 (incorporating the piston 117) allowing displacement of the piston 117 from one end of the chamber 125 to the opposite end of the piston chamber 125. The displacement of the piston 117 allows for the retraction and expansion of bellows 113.

For operation of the bellows 113, the working fluid enters the pneumatic control module 123 via a back pressure regulator 133 after a desired upstream pressure has been achieved. Then, the working fluid is forwarded within the pneumatic control module 123 to valve means 135 prior to reaching a four-way valve 129. Valve means 135 allows for users within the accommodation zone 33 to control operation of the scrubbing assembly 119. Four-way valve 129 selectively forwards the working fluid to the piston chamber 125. Valve means 135 are substantially similar to previously described valve means 97.

The pneumatic control module 123 comprises a valve assembly 127 for forwarding the working fluid to the piston chamber 125 in order to drive the piston 117. Valve assembly 127 comprises the four-way valve 129 and low pressure pilot valves 131a and 131b. The four-way valve 129 selectively forwards the working fluid to two ports 130a, 130b of piston chamber 125. Each port 130a, 130b is located at opposite ends of the piston chamber 191, thus allowing the working fluid to displace the piston 117 from a first position to a second position and vice versa. For this, low pressure pilot valves 131a, 131b are, respectively, adapted to measure the pressure at ports 130a, 130b of the piston chamber 125. The low pressure pilot valves 131a, 131b indicate to the four-way valve 129 which of ports 130a or 130b the working fluid should be directed to so as to displace the piston 117 from one end of the piston chamber 125 to the opposite end of the piston chamber 125.

A back pressure regulator 137 allows venting of the whole system to an audible alarm such as a siren 139 after a desired upstream pressure is reached. The siren 139 may be activated as an alarm externally by over pressurising the fluid path 89 in order to emit an alarm signal.

A pressure gauge 141 indicates the working fluid pressure upstream of valve means 135 and a pressure gauge 142 indicates the working fluid pressure prior to back pressure regulator 137.

After operating the scrubbing assembly 119, the working fluid is conducted via the pneumatic control module 123 to pump means 95 (such as a suction blower) to draw air onto the treatment means 93 as previously explained. The working fluid then flows to treatment means 113 for operation thereof.

Treatment means 228 comprises a water cooler assembly (see FIG. 7) for cooling drinking water to be consumed by the occupants of accommodation zone 33. The water cooler assembly 228 is operated by the working fluid after operating treatment means 103. The water cooler assembly 228 may be, for example, a container 114 comprising a coil 116 through the working fluid flows for cooling water contained in the container.

The working fluid, after operating treatment means 113, is then stored in cylinder 99. Alternatively, the working fluid may be discharged to the atmosphere.

An emergency air supply 143 is also provided. The emergency air supply 143 comprises a stored source of air under pressure communicated with the working fluid path 89. The entry of the emergency air into the working fluid path 89 is controlled by a spring loaded check valve 145 with its pressure threshold set below that of the back pressure regulator 133. The spring loaded check valve 143 (see FIG. 8) opens due to the decrease in working fluid pressure, allowing air from the emergency supply 143 to enter the working fluid path that operates the scrubbing assembly 119. This allows for the compressed air supply to operate the scrubbing assembly 119. The emergency air supply 143 may also be used for increasing the temperature inside the accommodation zone 33. This is accomplished by turning off the supply of working fluid from cylinders 91 via valve means 97 (see FIG. 6) and replacing the working fluid with air from the emergency air supply 143. The lack of working fluid flow (due to the closure of valve means 97) stops the air cooling process via treatment means 93 and 101.

Figure 10:
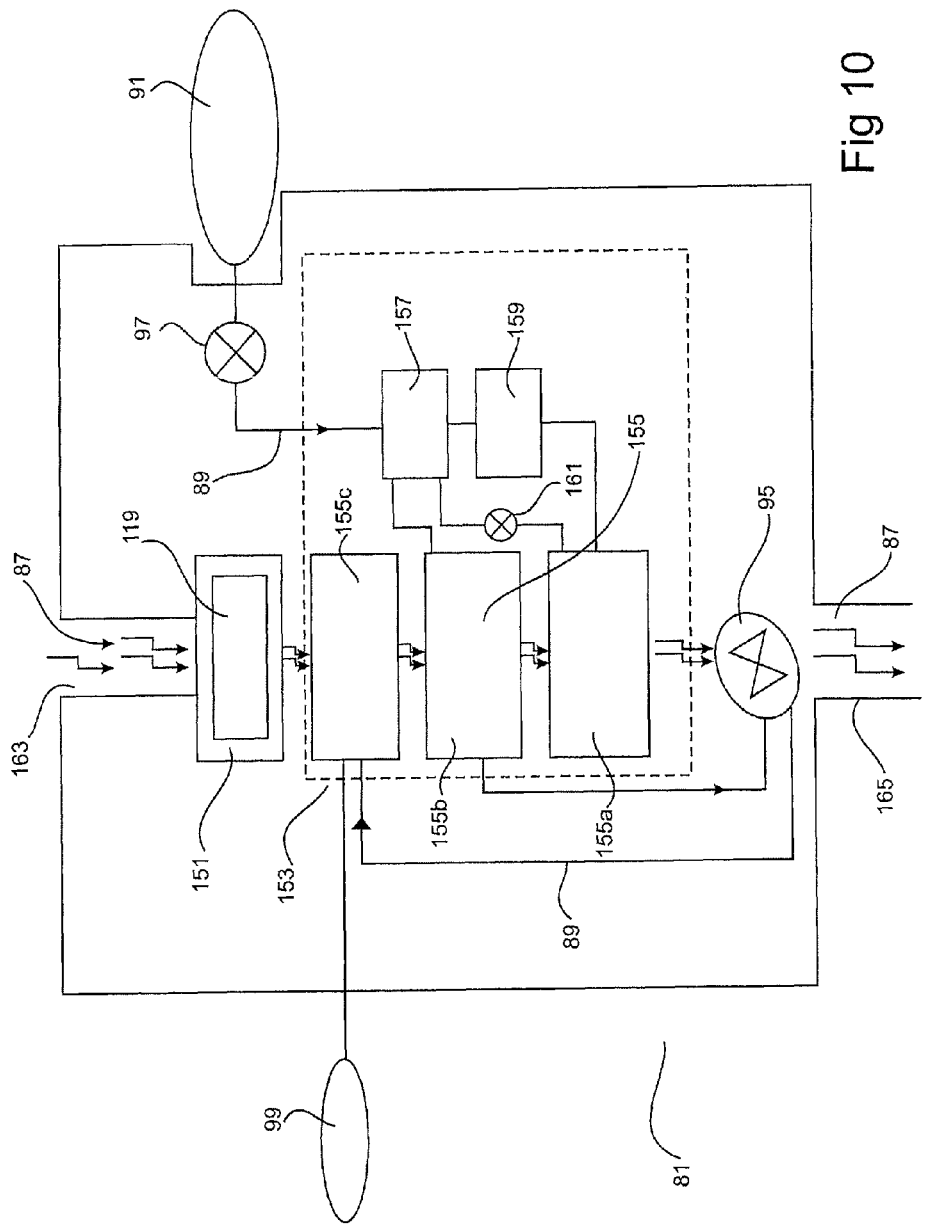
FIG. 10 is a schematic view a module incorporated in the refuge chamber, the module incorporating a first arrangement of an air treatment apparatus according to a third embodiment of the invention.
Figure 11:
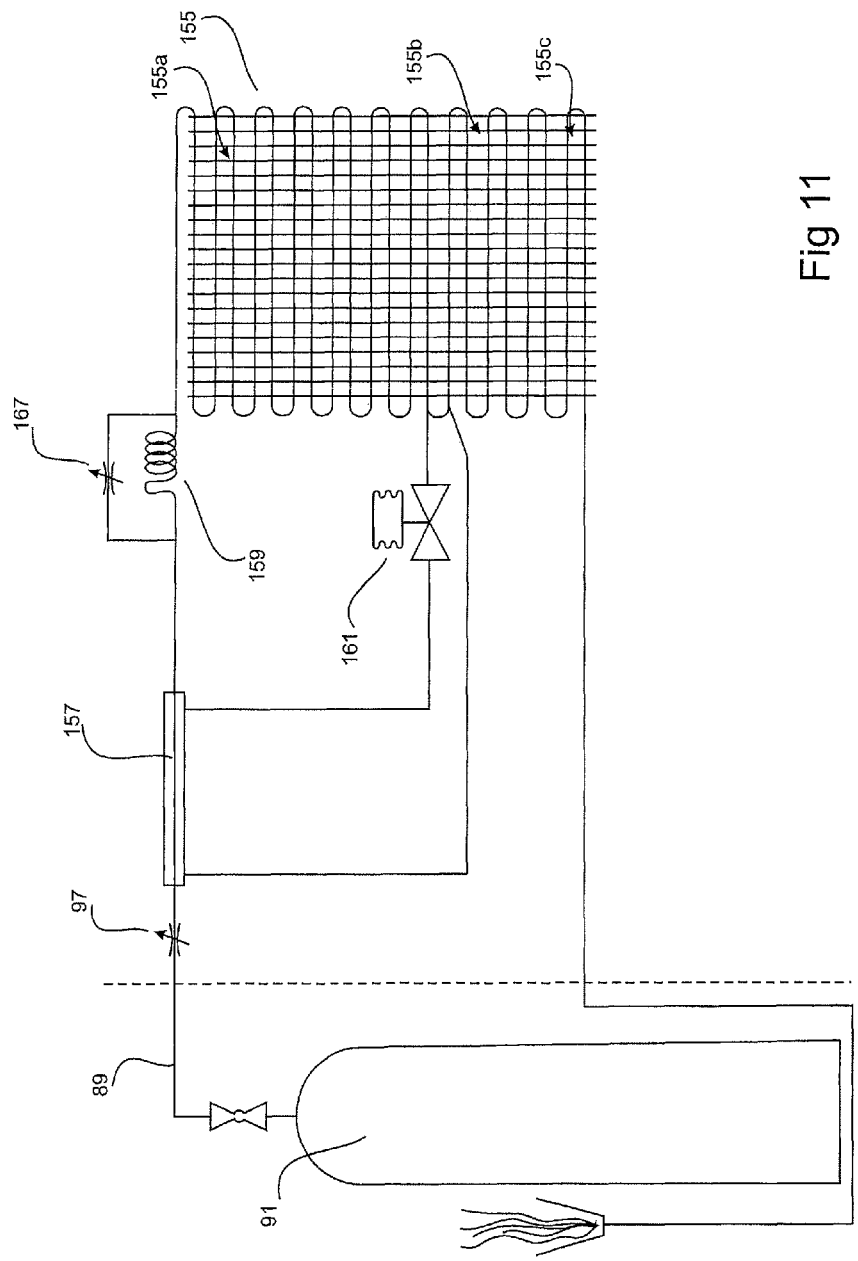
FIG. 11 is a schematic view of an air treatment apparatus included in the module shown in FIG. 10.

FIGS. 10 and 11 shows an apparatus 81 according to a third embodiment of the invention. Similar reference numerals are used to identify similar parts in the apparatus 81 according to the first and second embodiment of the invention.

The apparatus 81 comprises first treatment means 151 and second treatment means 153. Treatment means 151 and 153 are adapted to treat the air 87 within the accommodation zone 33 of the refuge chamber.

The apparatus 81 incorporates an air inlet 163 for air intake from the accommodation zone 33 of the refuge chamber and an air outlet 165 for returning treated air to the accommodation zone 33. Inlet 163 and outlet 165 are communicated with air inlets 77 and air outlets 79 of housing 75. A pump means 95 delivers the air 87 of the refuge chamber to the apparatus 81 to interact with the treatment means 151 and 153. Pump means 95 may comprise fan or blower systems.

The first treatment means 151 comprises an air scrubbing assembly 119 as described with reference to the second embodiment of the invention.

The second treatment means 153 comprises a multiple radiator heat exchanger 155. In the arrangement shown in FIGS. 10 and 11, the heat exchanger 155 comprises three radiators 155a, 155b and 155c. The radiators 155 are interconnected to allow a working fluid flow from the first radiator 155a to the third radiator 155c. Radiator 155a is upstream with respect to radiators 155b and 155c. Radiator 155c is downstream with respect to radiators 155a and 155b.

As have been described with reference to the first and second embodiment, a working fluid stored in a bank of cylinders 91 is delivered through the working fluid path 89 to operate first and second treatment means 151, 153 and the pump means 95. The working fluid stored in the cylinders 91 may comprise liquefied $CO_2$.

Referring to FIG. 10, the working fluid is delivered to the radiator 155a through the working fluid path 89. A tube heat exchanger 157 and a capillary tube 159 are located upstream of the radiator 155a. The capillary tube 159 is located between the tube heat exchanger 157 and the first radiator 155a.

The capillary tube 159 allows control of the expansion of the working fluid. This facilitates adjustment of the heat exchanging capacity of the radiator 155a. Thus, apparatus 81 may be configured for operation in refuge chambers installed in either cold or hot mines by varying the capillary tube 159. In some arrangements, the radiator 155a may solely operate as a dehumidifier extracting the humidity from the air. For example, in cold mines cooling of the air might not be desirable.

The tube heat exchanger 157 pre-heats the working fluid prior to entering the capillary tube 159. The tube heat exchanger 157 comprises an inner tube and outer tube surrounding the inner tube allowing heat transfer between first and second fluids that flow, respectively, through the inner and outer tubes. In the arrangement used in this embodiment, the outer tube receives working fluid exiting the first radiator 155a. The inner tube of the heat exchanger 157 receives working fluid exiting the cylinder 91. As the working fluids travels through the inner tube, the working fluid is pre-cooled by the colder working fluid (coming from the first radiator 155a). The pre cooled working fluid (which passes through the inner tube) is then delivered to the capillary tube 159.

A constant pressure valve 161 is located between the exit of the first radiator 155a and the entrance of the tube heat exchanger 157. The constant pressure valve 161 maintains the working fluid within the first radiator 155a at a specific pressure. In this way the working fluid is maintained within the first radiator 155a at a constant boiling point temperature, avoiding moisture from freezing on the coil surface of the radiator 155a. The presence of ice in the coils of the radiator 155a blocks air from passing through the radiator 155a. This reduces cooling of the air. In a particular arrangement, the constant pressure valve 61 is maintained approximately at 450 psi which maintains the boiling temperature of the working fluid at about 20° F.

After operating the first radiator 155a, the working fluid exits the constant pressure valve 161, undergoing a pressure change which reduces the temperature of the working fluid. The colder working fluid is directed to the tube heat exchanger 157. As previously described, the tube heat exchanger 157 reduces the temperature of the working fluid that exit cylinder 91 and is about to enter the capillary tube 159 and the first radiator 155a.

After exiting the tube heat exchanger 157, the working fluid operates the second radiator 155b. The second radiator 155b is mounted below the scrubbing assembly 121. This allows extraction of the heat produced during the scrubbing process. At this stage most of the working fluid is mostly in gaseous form and apt to drive the pump means 95. The pump means 95 comprises a blower system which creates an air current between air inlet 163 and air outlet 165. The air current delivers the air from the accommodation zone 33 of the refuge chamber through the scrubbing assembly 119, onto the heat exchanger 155 and returns the cooled air to the accommodation zone 33.

After operation of the pump means 95, the working fluid undergoes a further pressure drop and, thus, a further reduction of temperature. The working fluid is then delivered to the third radiator 155c for further cooling of the air. The air then exist apparatus 81 though outlet 165.

The air exiting outlet 165 is breathable and cool, and is delivered via inlet 77 (see FIG. 4) to the accommodation zone 33 to maintain living conditions in the refuge chamber.

The working fluid, after operating the third radiator 155c is then stored in cylinder 99. Alternatively, the working fluid may be discarded to the atmosphere.

Referring to FIG. 11, for example, a needle valve 167 may be located in parallel to the capillary tube 157. This arrangement allows bypassing of the capillary tube 159. The needle valve 167 can be controlled to allow flow of working fluid primarily through the needle valve 167. This is particularly, useful in the event that cylinder 91 runs low on working fluid. By bypassing the capillary tube 159 it is still possible to run the pump means 95 to drive air through the scrubbing assembly 121 until total exhaustion of the working fluid supply.

Figure 12:
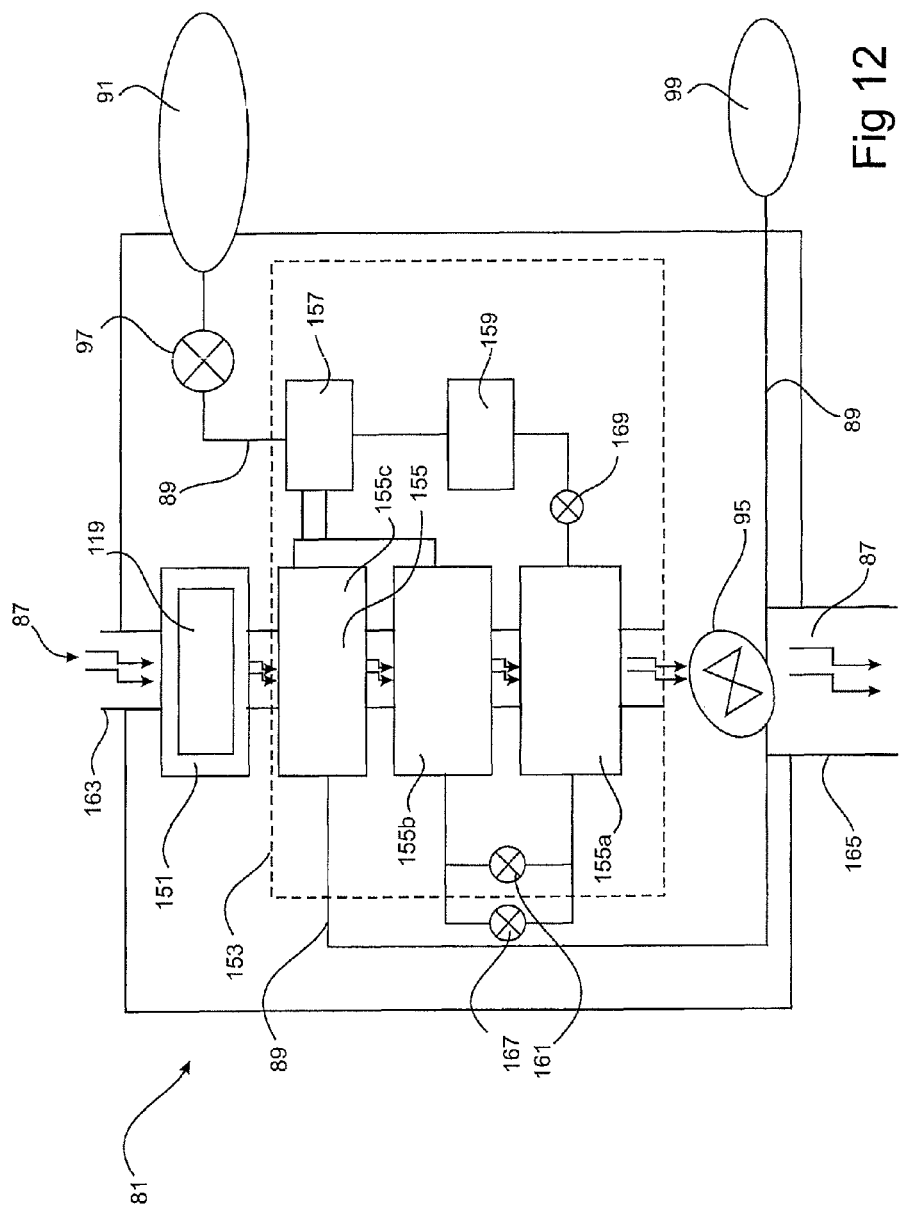
FIG. 12 is a schematic view a module incorporated in the refuge chamber, the module incorporating a second arrangement of an air treatment apparatus according to a third embodiment of the invention.

FIG. 12 shows a second arrangement of the apparatus 81 of the third embodiment of the invention. In this arrangement, the working fluid is delivered from the cylinder 91 through the tube heat exchanger 157 and the capillary tubes 159 to the first radiator 155a. A valve system 169 provides control of the working fluid flow into the first radiator 155a. The valve system 169 comprises a plurality of adjustable on/off valves. After operating the first radiator 155a, the working fluid is delivered to the second radiator 155b for operation thereof. The working fluid is then delivered to the tube heat exchanger 157 for cooling of the working fluid that exits the cylinder 91 and which will be fed into the first radiator 155a. The output of the tube heat exchanger 157 is operatively connected to the inlet of the third radiator 155c for delivery of the working fluid exiting the tube heat exchanger 157. After operating the third radiator 155c the working fluid is forwarded to the pump means 95 for operation thereof.

In the second arrangement of the third embodiment of the invention, the capillary tube 159 may also be bypassed by a valve 167 arranged in parallel to the capillary tube 159 as described with reference to the first arrangement of the third embodiment.

The apparatus 81 according to the third embodiment may allows use of the scrubbing assembly 119 and pump means 95, without the heat exchanger 155. A bypass valve 167 may be fitted between radiators 155a and 115b to allow the working fluid bypass valve 161 for the total exhaustion of the working fluid.

Moreover, other arrangements of the third embodiment of the invention may include a scrubbing assembly 119 and pumps based on bellows 113 as described with reference to the second embodiment of the invention. Bypass systems allow activation of the scrubbing assembly 119 and propeller assemblies based on bellows 113.

Also, apparatus 81 according to the third embodiment of the invention may also include other type of treatment means, such as evaporative cooler assemblies and water cooling assembly as described with reference to the second embodiment of the invention. These treatment means may be located along the working fluid path 89 and operated by the working fluid.

Also, the first and second arrangement of the third embodiment may include valve means to stop delivery of the working fluid to the working fluid path and/or to allow entrance of emergency air into the fluid path for operation of the treatment means connected along the working fluid path 89.

From the forgoing, it is evident that the present invention provides a simple yet highly effective arrangement for maintaining a life-sustaining environment within the refuge chamber 10 without the need for external sources. The life-sustaining environment can be maintained so long as there are adequate supplies of working fluid (carbon dioxide) to continue the air treatment in order to control the climate within the accommodation area 33.

It should be appreciate that the scope of the invention is not limited to the scope of the embodiment described.

The apparatus 81 may be used for treatment any type of fluid medium contained in a enclosed environment. Also, the working fluid may be any appropriate fluid that absorbs heat during expansion and can operate the associated treatment means.

Moreover, apparatus 81 may comprise any number of treatment means which may be arranged along the working fluid as required. The treatment means may be of any kind and should not be restricted to the examples used in the present description. As way of an example, the evaporative cooler assembly need not necessarily be based on direct evaporative cooling. The evaporative cooler assembly may be of the type which uses indirect evaporative cooling.

While the invention has been described in relation to a refuge chamber typically used in underground mining operations, it should be understood that it may have applications in various other fields, such as life-sustaining modules used in submarine environments and underground protective shelters (such as nuclear shelters).

Modifications and improvements can be made without departing from the scope of the invention.

Throughout the specification and claims, unless the context requires otherwise, the word "comprise" or variations such as "comprises" or "comprising", will be understood to imply the inclusion of a stated integer or group of integers but not the exclusion of any other integer or group of integers.

The invention claimed is:

1. An apparatus for treating a medium, the apparatus comprising at least one reservoir for storing a working fluid under pressure for generating a flow of the working fluid after release of the working fluid from the reservoir, a flow path to allow flow of the working fluid, and treatment means comprising a scrubbing assembly for removing CO and $CO_2$ from the medium and a heat exchanger, the reservoir being fluidly connected to the flow path for generating the flow of the working fluid within the flow path after release of the working fluid from the reservoir, the heat exchanger having a section defining at least a portion of the flow path to allow the working fluid to pass through the heat exchanger for operation thereof, and a fan system having a section defining at least another portion of the flow path to allow the working fluid to drive the fan system for delivering the medium to the heat exchanger for heat exchange to occur between the medium and the section of the heat exchanger.

2. An apparatus for treating a medium according to claim 1 wherein the medium is a fluid medium.

3. An apparatus for treating a medium according to claim 2 wherein the fluid medium comprises air.

4. An apparatus for treating a medium according to claim 1 wherein the reservoir for storing the working fluid comprises a source of the working fluid under pressure and the flow path communicating with the source.

5. An apparatus for treating a medium according to claim 4 wherein the source is a self-contained source.

6. An apparatus for treating a medium according to claim 5 wherein the self-contained source comprises a gas cylinder.

7. An apparatus for treating a medium according to claim 1 wherein the working fluid comprises a pressurized fluid.

8. An apparatus for treating a medium according to claim 1 wherein the working fluid comprises carbon dioxide.

9. An apparatus for treating a medium according to claim 1 wherein the treatment means comprise at least one heat exchanger.

10. An apparatus for treating a medium according to claim 9 wherein the at least one heat exchanger comprises a plurality of radiators connected in series.

11. An apparatus for treating a medium according to claim 10 further comprising at least one capillary tube for controlling the entrance of the working fluid into a first radiator of the heat exchanger.

12. An apparatus for treating a medium according to claim 11 further comprising valve means for bypassing the at least one capillary tube to deliver the working fluid to the heat exchanger.

13. An apparatus for treating a medium according to claim 10 further comprising a tube heat exchanger for pre-cooling the working fluid prior entering the heat exchanger.

14. An apparatus for treating a medium according to claim 13 the tube heat exchanger is operated by the working fluid.

15. An apparatus for treating a medium according to claim 10 further comprising a constant pressure valve for controlling the pressure in the heat exchanger.

16. An apparatus for treating a medium according to claim 1 wherein the treatment means comprise scrubbing means and at least one heat exchanger connected in series allowing scrubbing of the medium prior to the medium undergoing heat exchange.

17. An apparatus for treating a medium according to claim 1 further comprising a water cooler operated by the working fluid to reduce the temperature of water contained in a water reservoir.

18. An apparatus for treating a medium according to claim 1 further comprising an emergency air supply operatively connected to the working fluid flow path.

19. A refuge chamber comprising an apparatus for treating a medium according to claim 1.

20. A refuge chamber according to claim 19 further comprising a service zone, a module for accommodating the apparatus and an accommodation zone; the service zone comprising a source of the working fluid to operate the apparatus and an emergency air supply.

21. A refuge chamber according to claim 20 wherein the module is under vacuum.

22. A refuge chamber according to claim 21 further comprising an alarm system adapted to be operated by the working fluid.

23. A method for treating a medium using the apparatus according to claim 1.

24. An apparatus for treating a medium according to claim 9 wherein the at least one heat exchanger is adapted to cool and/or de-humidify the medium.

25. A method for cooling a confined area without the need for external power sources comprising releasing a working fluid from a reservoir storing the working fluid under pressure to generate a flow of a working fluid in a flow path, passing the working fluid through a section of a heat exchanger for operation thereof, delivering air to the heat exchanger via a fan system driven by the flow of working fluid for heat exchange to occur between the air and the section of the heat exchanger, delivering the cooled air to scrubbing means for removing CO and $CO_2$ from the air to form scrubbed cooled air, and delivering the scrubbed cooled air into the confined area.

26. A method according to claim 25 wherein the delivery means are driven by the working fluid after passing in relation to the heat exchanger.

27. A method according to claims 25 wherein the air comprises air of the confined area.

28. A method according to claim 26 wherein the air comprises air of the confined area.

29. An apparatus for treating a medium, the apparatus comprising at least one reservoir for storing a working fluid under pressure for generating a flow of the working fluid after release of the working fluid from the reservoir, a flow path to allow flow of the working fluid, and treatment means for subjecting the medium to treatment comprising a heat exchanger, the reservoir being fluidly connected to the flow path for generating a flow of the working fluid within the flow path after release of the working fluid from the reservoir, the heat exchanger having a section defining at least a portion of the flow path to allow the working fluid to pass through the heat exchanger for operation thereof, and a fan system having a section defining at least another portion of the flow path to allow the working fluid to drive the fan system for delivering the medium to the heat exchanger for heat exchange to occur between the medium and the section of the heat exchanger.

30. A method for cooling a confined area without the need for external power sources comprising releasing a working fluid from a reservoir storing the working fluid under pressure to generate a flow of a working fluid in a flow path, passing the working fluid through a section of a heat exchanger for operation thereof, delivering air to the heat exchanger via a fan system driven by the flow of working fluid for heat exchange to occur between the air and the section of the heat exchanger to form cooled air, and delivering the cooled air into the confined area.

* * * * *